Figure 1:
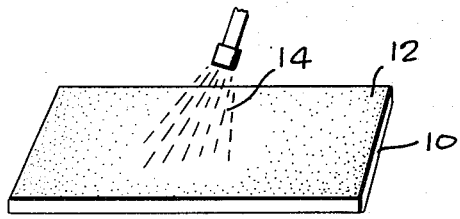

United States Patent
Molina

[11] 3,826,917
[45] July 30, 1974

[54] REVERSE MAGNETIC INSPECTION METHOD

[75] Inventor: Orlando G. Molina, Westminster, Calif.

[73] Assignee: Rockwell International Corporation, El Segundo, Calif.

[22] Filed: May 16, 1973

[21] Appl. No.: 360,989

[52] U.S. Cl. ................................. 250/302, 324/38
[51] Int. Cl. ............................................ G01n 21/16
[58] Field of Search ....................... 250/302; 324/38

[56] References Cited
UNITED STATES PATENTS

| | | | |
|---|---|---|---|
| 2,267,999 | 12/1941 | Switzer | 250/302 X |
| 3,344,345 | 9/1967 | Molina | 324/38 |
| 3,445,759 | 5/1969 | Pevar | 250/302 X |
| 3,546,130 | 12/1970 | Magdalin | 250/302 X |

*Primary Examiner*—Archie R. Borchelt
*Attorney, Agent, or Firm*—Charles T. Silberberg; L. Lee Humphries

[57] ABSTRACT

Method for nondestructive magnetic inspection of an object for detecting defects and discontinuities in the surface thereof, by applying a coating, preferably an organic coating, containing a fluorescent material, to the object, establishing magnetic flux lines at an angle, preferably substantially perpendicular, to the suspected defects and discontinuities in a surface of the object, applying non-fluorescent magnetic particles, preferably suspended in a liquid medium, over the coating on the surface of the object, and causing these particles to agglomerate and form indications on the coating adjacent to the surface defects and discontinuities in the object, and inspecting the body under fluorescent or ultraviolet light to reveal such defects and discontinuities indications as defined by the agglomerated magnetic particles, against a contrasting fluorescent background coating. Where a record of the indications of defects and discontinuities is desired, a strippable fluorescent coating is initially applied, and following magnetization to locate and reveal the surface defects and discontinuities, a clear strippable coating is applied over the fluorescent coating containing the magnetic indications of defects, and the resulting coating containing the indications formed by the agglomerated magnetic particles can be stripped from the surface of the object, and such coating employed as a record of such indications.

21 Claims, 5 Drawing Figures

REVERSE MAGNETIC INSPECTION METHOD

BACKGROUND OF THE INVENTION

This invention relates to nondestructive testing of bodies by magnetic particle inspection procedure, for detection of defects and discontinuities in the surface of the body, and is particularly concerned with a method for achieving high sensitivity magnetic inspection of bodies to reveal fine defects by employing relatively inexpensive non-flourescent magnetic particles, and also permitting low sensitivity magnetic inspection of bodies to reveal relatively coarse defects.

One conventional magnetic particle inspection method for detection of defects, flaws and discontinuities in objects or parts, utilizes fluorescent-type magnetic particles in order to obtain high sensitivity inspection of minute flaws, defects or microcracks. Fluorescent magnetic particle inspection methods of this type are characterized by the typical fluorescent indications formed by the particles. When viewed under black light, that is fluorescent or ultraviolet light, these particles stand out and contrast against the non-fluorescent natural surface of the part. However, fluorescent magnetic particles are relatively expensive to manufacture since they require coating with a fluorescent material. The fluorescent material is subject to deterioration, so that process controls are required in order to test the effectiveness of the particles periodically. Although conventional fluorescent magnetic particle inspection methods and systems hence are more expensive to operate than non-fluorescent methods and systems, they are utilized because of their high sensitivity for disclosing small cracks and discontinuities in objects.

In my U.S. Pat. No. 3,564,249 there is disclosed a reverse penetrant method for nondestructive inspection of objects wherin a liquid dye penetrant containing a conventional daylight visible bleeding dye is initially applied to a test surface, and then removed therefrom leaving residual dye penetrant within cracks and defects. A fluorescing developer coating is applied to the test surface and viewed under ultraviolet or fluorescent light, the fluorescing background revealing a non-fluorescing pattern of defects in the form of a black trace wherever residual dye penetrant contacts the developer coating. In this process, residual dye or dye penetrant migrates through the fluorescent coating, killing the fluorescence thereof wherever cracks or surface defects are located, so that the resulting indications of such cracks appear completely black against the fluorescent background coating.

It is a chief object of the present invention to provide a magnetic inspection procedure employing a fluorescent background coating in conjunction with relatively inexpensive non-fluorescent magnetic particles and utilizing conventional magnetic inspection equipment, for detecting surface cracks, flaws and discontinuities, with high sensitivity, particularly where minute cracks or microcracks are present. Another object is the utilization of the invention procedure under conditions resulting in lower sensitivity where relatively coarse cracks are present.

DESCRIPTION OF THE INVENTION

Applicant has surprisingly discovered that by initially applying a background coating containing a fluorescent material, and which preferably also may include a material to enhance the fluorescence of the coating, such as a white pigment, conventional magnetic particle inspection techniques can be employed involving application of non-fluoresecent-type, e.g. black, magnetic particles with conventional magnetic flux generating apparatus, to obtain magnetic particle indications of minute flaws and defects on the fluorescent coating, which when viewed under black light or fluorescent illumination, will absorb the ultraviolet light without re-emitting visible light and will appear as contrasting black non-fluorescent magnetic particle indications of the flaws and defects against the contrasting fluorescent coating, with a sensitivity range equal to, or even higher than that obtained utilizing the conventional magnetic inspection method employing expensive fluorescent magnetic particles.

Thus, according to the present process, a method for nondestructive magnetic inspection of an object, for detection of defects and discontinuities in the surface of the object, is provided which comprises applying to a surface of the object a coating containing a fluorescent material, such as an organic coating containing a fluorescent dye, establishing a field of magnetic flux lines relative to the object so that lines of flux pass at an angle, and preferably substantially perpendicular, to the suspected defects in the object surface, applying non-fluorescent magnetic particles, preferably suspended in a suitable liquid medium, over the fluorescent coating and causing the magnetic particles to agglomerate or group together on the coating adjacent to or over the surface defects and discontinuities, and inspecting the body under fluorescent light (black or ultraviolet light) to locate the defects and discontinuities as defined by the magnetic particle indications produced by the agglomerated magnetic particles against the fluorescent background coating.

According to a preferred embodiment, the coating containing the fluorescent material or dye can optionally include a material or pigment, preferably a white pigment such as titanium dioxide, to provide greater covering and hiding ability of the coating, and to enhance the fluorescence of the coating produced by the fluorescent material.

In the invention process, a surface of the object or part to be inspected is first covered with the fluorescent coating, and the object or part can be magnetized, according to conventional magnetic inspection procedure, for example by placing an electromagnet on the fluorescent coating applied to the part surface so that when the magnetizing current is turned on, a magnetic flux field is generated around the part, with at least some flux lines positioned at an angle, preferably substantially perpendicular, to the discontinuities or flaws in the surface of the object. While the magnetizing force is on, the magnetic particles are applied, preferably in the form of a liquid medium such as an organic solvent in which the magnetic particles are suspended, e.g. by spraying, over the coating on the surface of the object to provide a uniform distribution and concentration of the magnetic particles over the part surface.

If a record of the flaw indication provided by the pattern of magnetic particles is required, e.g. to form a permanent record of the location and size of the defects and discontinuities in the surface of the object, a strippable coating can be initially applied, so that following magnetization and the agglomeration of the magnetic particles according to the pattern of flaws and discontinuities, the coating can be stripped from the part and, if desired, copies of the record of magnetic indications can be made, e.g. by suitable photographic means.

By provision of the invention process wherein contrasting magnetic particle indications are revealed against a highly contrasting fluorescent background provided by the coating applied to the object, a sensitivity range higher than that of the more expensive conventional magnetic particle inspection process employing fluorescent magnetic particles can be obtained, while employing the relatively inexpensive non-fluorescent magnetic particles, which require no recoating with fluorescent materials. Further, such high sensitivity for the revelation of minute cracks or discontinuities employing the reversal magnetic particle process of the present invention requires very little black light illumination. As an additional feature, it was observed according to the present invention that the indications of relatively large cracks can be detected by means of ordinary white light, particularly where the background coating contains a pigment such as titanium dioxide. Accordingly, the invention process provides a dual sensitivity range permitting the detection and viewing of very small cracks or microcracks by inspection under black light illumination, and also the detection of relatively gross or large cracks or discontinuities by viewing under ordinary white light illumination.

Additional advantages are also achieved according to the present invention. Thus, the presence of the fluorescent coating eliminates contamination of the bare surface of the part to be inspected by the magnetic particles, and hence provides a markedly low level of undesirable mechanically entrapped magnetic particles. The fluorescent reversal magnetic process also results in freedom from undesirable magnetic particle background discoloration. The invention process is extremely easy on the eyes of the inspector, since according to the present process which requires only a minor amount of black light illumination, it is not necessary to view the indications in the degree of darkness needed for conventional fluorescent magnetic particle processes, and also due to the unique contrast obtained between the magnetic particles and the fluorescent background. Of particular significance the present process permits an inspector to view both the configuration of the part and the defects simultaneously by the employment of the fluorescence-emitting coating. This feature provides an inspector with continuous knowledge of the relationship and orientation between the part configuration and the defective conditions therein. In the conventional fluorescent magnetic particle inspection process employing fluorescent magnetic particles, only the indications are seen and thus the relationship between part configuration and defects which are found is lost.

It is noteworthy that in the process of my above U.S. Pat. No. 3,564,249 the fluorescent coating is employed as a developer in conjunction with a liquid dye penetrant, wherein residual dye penetrant entrapped in the surface defects is drawn up out of the surface defects into the developer coating and the migration of the residual dye in the penetrant into the fluorescent coating kills the fluorescence thereof wherever cracks or surface defects are located.

On the other hand in the present reversal magnetic particle inspection process the fluorescent coating separates the non-fluorescent magnetic particles from the part surface and following magnetization and the orientation of the magnetic particles on the fluorescent coated surface, the particles forming the indications remain physically on the surface of the coating which then provides a fluorescent contrasting background for the magnetic particle indications upon the application of fluorescent light.

The detailed practice of the invention process will be understood more readily from the description below, taken in conjunction with the accompanying drawing wherein FIGS. 1 to 5 illustrate steps and conditions in the invention process. The part or object to be inspected, e.g. in the form of a plate indicated at 10 in the drawing, and which has magnetic permeability and retentivity, such as a steel or other ferromagnetic metal, usually is first cleaned of all foreign material including soil and oily material. Any conventional cleaning procedure can be employed, for example a degreaser such as trichloroethylene.

A fluorescent background coating 12 is then applied to the surface of the object in sufficient amount to cover the surface of the part to be inspected and to offset the color thereof. For this purpose any suitable coating containing a fluorescent material or dye can be employed, and such coating can be nonstrippable or strippable. Preferably the coating is organic and of the type described in my U.S. Pat. No. 3,279,243. Such coatings have an organic polymer base comprised for example of vinyls, acrylics, nitrocellulose, butyrates and latex, the vinyl polymers and copolymers, such as vinyl chloride resin and vinyl chloridevinyl acetate copolymers being particularly useful. Such coating composition includes a volatile solvent such as methyl ethyl ketone, and generally a plasticizer, among suitable plasticizers for this purpose including dioctyl phthalate and butyl phthalate. The plasticizer provides suitable flexibility of the resin binder. A coloring material such as a pigment of a desired color, particularly white titanium dioxide, preferably but not necessarily is incorporated in suitable amount into the coating, for the purpose previously noted and further pointed out hereinafter. These coating compositions as described in my U.S. Pat. No. 3,279,243 are broadly characterized as a vinyl base paint.

The coating composition also includes a fluorescent material, preferably a fluorescent dye. Various types of fluorescent dyes can be employed including for example the dye marketed as Fluorol 7GA as well as other fluorescent dyes such as those marketed as Calcofluor Yellow, Azosol Brilliant Yellow 6GF, Rhodanine B, Rhodanine 6 GDN, Calcofluor White RW, Blancophor White AW, Auramine and Eosine G. One or more of such fluorescent dyes can be incorporated into the coating, employing a small amount of such dyes, e.g. ranging from about 0.5 to about 5 parts by volume of the composition.

A particularly effective strippable coating as described in Example I of above U.S. Pat. No. 3,279,243 is a vinyl base paint comprising about 19 percent vinyl chloride-vinyl acetate copolymer resin, about 61 percent toluene, 15 percent methyl ethyl ketone, 6 percent diisooctyl phthalate and a minor amount of titanium dioxide, a coating of substantially the latter composition being marketed as Andrew Brown Brolite White Inspection Background Coating. However, if desired, nonstrippable coatings can be employed as also described in above U.S. Pat. No. 3,279,243. To these coatings there is added the above-noted minor amount of fluorescent material or dye. The coating composition is applied to the part surface in any convenient manner, preferably by lightly spraying the coating composition on the part surface, as indicated at 14 in FIG. 1 of the drawing.

The object or part 10 containing the fluorescent coating 12 is then magnetized employing conventional magnetic particle inspection equipment. Thus, for example, viewing FIG. 2 of the drawing, the legs 16 and 18 of an electromagnet 20 can be placed over or in contact with the area of the fluorescent coating 12 on the part surface, at the location thereon where cracks and discontinuities are suspected to be present, and the magnetizing current is turned on. In this manner magnetic flux lines indicated at 22 are generated, passing through the surface of the object and directed substantially at right angles to the suspected surface flaws and discontinuities. For this purpose, either a direct current or alternating current electromagnet can be employed, e.g. an electromagnet employing a half wave rectified D.C. current. Also, if desired, magnetizing apparatus can be employed in which the magnetizing current passes through the part being inspected. Alternatively, one or more permanent, e.g. bar, magnets can be employed to establish the magnetic flux field. In order to ensure the location and direction of all cracks and flaws on the part surface, the electromagnet 20 can be raised and then positioned and oriented at different angles on the coating 12, e.g. to a position at right angles to the position of the electromagnet shown in FIG. 2.

While the magnetizing force is on, the magnetic particles are applied over the coating 12 on the surface of the object. As previously noted, inexpensive non-fluorescent magnetic particles are employed in the present process. The magnetic particles employed preferably have high magnetic permeability but low retentivity. It is preferred to employ fine particle size magnetic particles for fine defects or microcracks because of the high sensitivity of such particles, although coarse magnetic particles can also be employed, for example using a selected combination of various size particles, where large cracks or discontinuities as well as small or minute defects or discontinuities are present in the object to be tested, all of which can be located by inspection under fluorescent light alone, or as result of the above-noted dual sensitivity advantages of the present process, employing both fluorescent light, and natural or white light. Preferably, the magnetic particles are black $Fe_3O_4$ particles, or for example red magnetic ($Fe_2O_3$) particles can be employed. When the part is inspected by fluorescent light the non-fluorescent magnetic particle indications will appear jet black when employing black magnetic particles, and a blackish red when employing red magnetic particles, which re-emit some visible light. In ordinary white light, for low sensitivity inspection of large cracks or defects according to the invention, where a coating containing white titanium dioxide and fluorescent material has been initially applied, the non-fluorescent black or red magnetic particles which may be employed will provide black or red indications against the white background coating.

Preferably, and particularly where high sensitivity is desired, the magnetic particles are dispersed in a liquid medium. Any suitable liquid medium can be employed for the magnetic particles. Thus for example organic solvents having a high flash point can be used, such as hydrocarbons, e.g. kerosene. However, water also may be used as a carrier medium for the magnetic particles where no problems are presented with respect to corrosion of the part. Where organic solvents are employed the excess magnetic particle dispersion can be removed from the part by treatment with an organic solvent. If desired, water soluble surfactants such as water soluble ethers of polyethylene glycol, e.g. Tergitol Nonionic TMN, a trimethyl nonyl ether of polyethylene glycol containing 6 ethylene oxide groups, or Tergitol Nonionic NPX, a nonyl phenyl polyethylene glycol ether containing 10.5 ethylene oxide groups, can be incorporated into such organic solvent media to form magnetic particle compositions or dispersions which are removable either by an organic solvent or by water, as for example to remove excess magnetic particle dispersion applied to the coating on the surface of the object, either before or after magnetic particle inspection. Such composition can contain, by volume, about 60 to 90 parts liquid hydrocarbon, e.g. kerosene as vehicle, about 5 to 35 parts water soluble surfactant, and about 2 to 10 parts magnetic particles.

Figure 2:
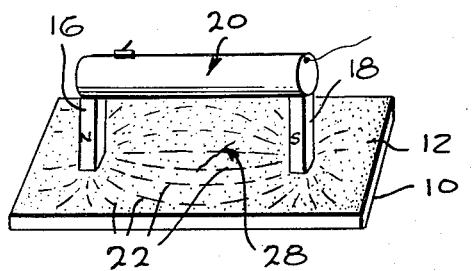

The magnetic particle dispersion or bath is distributed, as by spraying the bath stream over the initially applied fluorescent coating while the magnetizing force is on, as seen in FIG. 2. If desired, the magnetic current can be turned on the instant the bath stream is removed. This ensures that the greatest concentration of magnetic particles will be distributed over the coating 12 while the current is flowing, so that they can be attacted to any leakage fields created by the defects and discontinuities. If the object being inspected is composed of a material which has high magnetic retentivity, the dispersion or bath of magnetic particles alternatively can be applied to the part after the magnetizing force has been turned off. However, residual magnetic fields are generally weaker than magnetic fields when magnetizing current is flowing, and hence inspection by use of residual fields is less sensitive.

Although the magnetic particles can be applied directly as by dusting onto the coating 12, to be magnetized thereon as noted above, this procedure is not preferred if high sensitivity is to be obtained.

Figure 3:
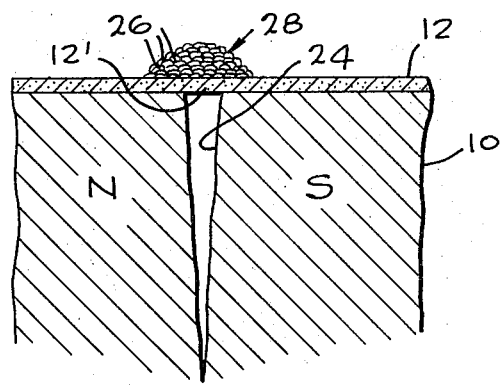

As result of the application of the magnetic field so that the flux lines 22 preferably are substantially perpendicular to the surface cracks or discontinuities, e.g. as indicated at 24 in FIG. 3, and exaggerated therein for greater clarity, due to variations in magnetic permeability of the part at the location of the cracks and discontinuities, in effect minute "N" and "S" poles are created on opposite swdes of such cracks and discontinuities. This causes the magnetic particles 26 to group together or to agglomerate, on the coating 12 across the N and S poles and over the coating which may cover the mouth of the cracks 24, to form magnetic particle indications 28 of such cracks or discontinuities, on the contrasting fluorescent coating. In the case of minute cracks and discontinuities, where the coating is continuous over the cracks, as indicated at 12' in FIG. 3 the magnetic particles agglomerate and group together as at 28 to form the particle indications, thus increasing the sensitivity of the inspection process. However, in the case of relatively large or coarse cracks, as indicated at 24' in FIG. 4, where the coating is discontinuous at the mouth of the crack, as indicated at 29, the magnetic particles will agglomerate across the mouth of the open crack and be supported on the coating at opposite sides of the crack, and thus provide magnetic indications 28 also of such coarse cracks or discontinuities.

Figure 5:
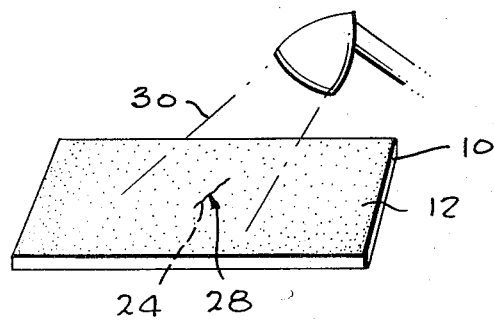
Figure 4:
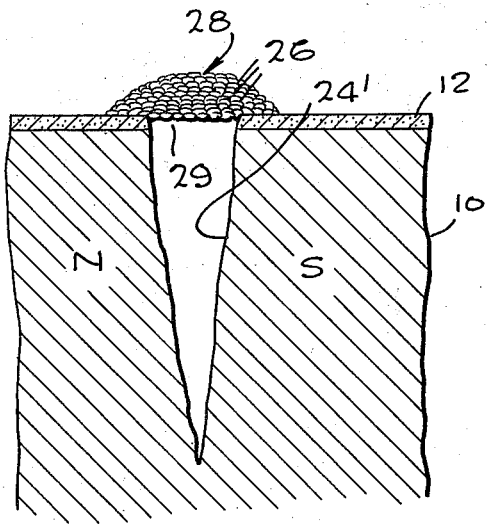

The object or part is then inspected as illustrated in FIG. 5 under fluorescent or ultraviolet light illumination indicated at 30 for visual indications of cracks, flaws and discontinuities. The resulting indications 28 of the cracks and discontinuities thus produced by such agglomeration of the magnetic particles are of jet black color when employing the preferred black magnetic particles and are highly visible and extremely easy to see against the fluorescent background coating previously applied to the part. The presence of the preferred white titanium dioxide pigment in the fluorescent coating, although not necessary as previously noted, is desirable in providing greater covering and hiding capacity, and enhances the fluorescence of the fluorescent material or dye therein. The part can be inspected under fluorescent light according to the present process to detect either or both minute cracks or defects, and large cracks or defects. Where it is desired to view a part under natural or white light for detection of gross cracks or discontinuities, according to the dual sensitivity features of the invention, the presence of the white pigment provides high contrast between the part surface and the coating and between the coating and the magnetic particle indications.

If following inspection of the part, a record of the indications is not required, the coating containing the magnetic particle indications thereon can be removed by treatment in a suitable solvent or by water washing depending upon whether the coating initially applied is an organic solvent soluble or water washable system.

However, if a record of the magnetic indications is required, and a strippable colored coating has been employed initially, the object or part following visual inspection first can be gently bathed in a solvent such as naphtha, trichloroethane or a Freon, i.e., a fluorocarbon such as Freon TF, which is 1,1,2-trichloro-1,2,2-trifluoroethane, where an organic medium, e.g. kerosene-type, dispersion of the magnetic particles was employed, to remove any remaining magnetic particle dispersion or organic medium thereof. With this gentle treatment, the magnetic indications 28 will not be washed off since the magnetic attraction provided by the magnetic retentivity of the object will hold the agglomerated magnetic particles forming the indications together over the location of the cracks and discontinuities. After the above-noted treating solvent, e.g. naphtha, dries, the indications can be "frozen" into the coating by spraying the coating with a clear quick-drying resin solution such as a clear strippable vinyl lacquer, which blends with or adheres to the initial fluorescent coating, and forms a strippable coat which serves to protect the magnetic indications from being dislocated on the initial fluorescent coating. It should be noted that both the initial fluorescent background, e.g. fluorescent vinyl-coating, and the clear, e.g. vinyl, coating are strippable, but in effect both coatings form a single strippable fluorescent coating containing the magnetic indications.

After drying of the clear, e.g. vinyl, overcoat, the entire coating system including the initially applied contrasting fluorescent strippable coating containing the "frozen" magnetic indications, and the clear strippable, e.g. vinyl, overcoat, can be stripped by lifting from an edge thereof. If the clear resin coating is too thin, a reinforcing application of a clear plastic tape such as a vinyl tape, can be applied over the clear resin overcoat. Examples of such reinforcing plastic tape are those marketed as 3M Clear Magic Tape or 3M Clear Plastic Tape No. 471. The resulting reinforced coating can be readily detached or stripped from the surface of the part. Copies of the resulting recording of the magnetic indications of the defects and discontinuities in the part can be obtained by using the stripping as a negative, e.g. for suitable contact printing.

The following are examples of practice of the invention.

EXAMPLE 1

An aircraft hydraulic actuator cylinder barrel constructed of 4340 steel containing minute cracks and relatively large or coarse cracks was cleaned of soil and oily materials by treatment with a trichloroethylene degreaser.

The surface of the above part was then sprayed with a strippable coating made fluorescent by the addition of fluorescent dyes. The strippable coating composition was in the form of a vinyl base paint comprising about 19 percent vinyl chloride-vinyl acetate copolymer resin, 1 percent white mineral oil, about 61 percent toluene, 14 percent methyl ethyl ketone, and 6 percent diisooctyl phthalate, and a small amount of non-chalking titanium dioxide (rutile). To 30 parts by volume of such coating composition was added 1 part by volume of Calcofluor White RW brightening agent and 1/5 part by volume Fluorol 7GA fluorescent dye. The coating composition contained sufficient methyl ethyl ketone as thinner to permit spraying of the coating composition on the part surface. Following spraying of the coating, the coating was permitted to dry for a period of about 1 to 2 minutes.

The coated part was then magnetized by placing the conducting legs of a Parker Probe electromagnet, a conventional magnetic particle inspection apparatus of a type similar to that illustrated in FIG. 2, on the coating and employing a half wave rectified D.C. magnetizing current. By suitable orientation of the legs of the electromagnet on the coating, the magnetizing current generates lines of flux in the part surface in a direction approximately perpendicular to the defects, cracks and discontinuities to be detected therein.

With the magnetizing current on, a suspension or dispersion of very fine black magnetic particles ($Fe_3O_4$) was distributed, as by spraying, over the white fluorescent coating on the surface of the part and between the legs of the electromagnet. The magnetic particle suspension had the following composition:

| Components | Per cent by volume |
|---|---|
| Pearl kerosene (vehicle) | 70 |
| Tergitol Nonionic TMN (surfactant to permit water removability) | 25 |
| Magnetic particles (black $Fe_3O_4$) | 5 |

Excess magnetic particle dispersion was removed by gentle water spraying.

Following application of the suspension over the fluorescent coating and orientation of the magnetic particles by the magnetic flux to form agglomerated particle indications on the coated surface of the part, the magnetizing current was turned off and the part was inspected under fluorescent or ultraviolet light for indications of the cracks and discontinuities in the surface of the part. The magnetic particle indications of the fine cracks or microcracks and the larger cracks in the above part were highly visible and appeared as sharp jet black lines against a brilliant fluorescent yellow green background coating.

It was observed that a remarkably clean surface was obtained on the above part after the magnetizing step was performed and presenting a clean background coating surface for viewing, whereas conventional fluorescent magnetic particle methods tend to leave a considerable amount of "fluorescent background" composed of surplus fluorescent particles.

EXAMPLE 2

The surface of the part treated according to the procedure of Example 1 was then viewed under white light illumination, revealing black magnetic particle indications of only the relatively coarse cracks and discontinuities in the surface of the part in the form of sharp black lines against an intense white background coating.

EXAMPLE 3

A record of the magnetic indications of cracks and discontinuities in the part treated according to Example 1 was obtained. For this purpose the part containing the fluorescent coating and the black magnetic particle indications produced by the agglomerated magnetic particles over the cracks and discontinuities of the part, was first bathed gently in Freon TF solvent to remove any remaining magnetic particle dispersion or kerosens solvent from the magnetic particle dispersion, but leaving the magnetic indications intact at their initial location on the coating. After the Freon TF solvent dried, the magnetic indications were "frozen" in place by spraying a coating of clear strippable vinyl lacquer over the initial fluorescent stripable vinyl coating and magnetic particle indications thereon.

After the vinyl overcoating dried, the entire coating system was stripped as a unit from the part by lifting from one edge, the resulting stripping was used as a permanent record of the indications, and could be used as a negative for suitable contact printing to obtain copies of the recorded magnetic indications.

EXAMPLE 4

The procedure of Example 1 was repeated but wherein the magnetic particle suspension employed was changed to omit the Tergitol Nonionic TMN component and adjusting the kerosene content to 95 percent by volume.

Following inspection of the part by means of fluorescent light, the fluorescent coating and the magnetic particle indications on the coating were removed by treatment with methyl ethyl ketone solvent.

EXAMPLE 5

A procedure similar to that of Example 1 was carried out with another test part of 4340 steel. In this case the specimen contained only minutes stress cracks.

On inspection of the fluorescent coated surface containing the magnetically oriented magnetic particle indications, again the indications were of jet black color and highly visible against the fluorescent coating.

EXAMPLE 6

The procedure of Example 1 was repeated but employing in place of the strippable coating employed in Example 1, a composition comprising a mixture of ethyl cellulose and titanium dioxide in the form of a commercial product marketed as Logo, to which a solvent vehicle of denatured alcohol was added. To 15 parts by volume of the above composition was added one-half part by volume of Calcoflor White RW brightener and one-fourth part by volume of Fluorol 7GA dye.

Following inspection under ultraviolet light, and then under natural or white light to obtain magnetic particle indications of both the minute flaws and discontinuities as well as the coarse flaws, the fluorescent coating and the magnetic particle indications thereon were removed from the part by water washing.

EXAMPLE 7

The procedure of Example 1 was repeated except employing a different magnetic particle inspection apparatus of a conventional type wherein the part was placed between the conducting heads of the apparatus and a half wave rectified D.C. magnetizing current was employed which passes through the part. Magnetic indications were obtained of a sensitivity comparable to the results of Example 1.

EXAMPLE 8

The procedure of Example 1 was repeated except that a conventional permanent magnet was employed to establish the magnetic flux field. Results comparable to those of Example 1 were obtained.

From the foregoing, it is seen that the invention provides a method particularly designed for obtaining high sensitivity magnetic particle inspection of an object or part, to reveal minute cracks or microcracks, and also adapted to lower sensitivity magnetic inspection of coarse cracks, by employment of the relatively inexpensive non-fluorescent magnetic particles which are generally employed only in low sensitivity magnetic particle inspection methods, in conjunction with an initial coating containing a fluorescent coloring material, preferably together with a white background pigment such as titanium dioxide, providing high fluorescent contrast between the coating and the magnetic particle indications, and avoiding the use of relatively expensive fluorescent magnetic particles usually required for high sensitivity inspection in prior art processes.

While I have described particular embodiments of my invention for the purpose of illustration within the spirit of the invention, it will be understood that the invention is not to be taken as limited except by the scope of the appended claims.

I claim:

1. A method for nondestructive magnetic inspection of an object, for detection of defects and discontinuities in the surface of said object, which comprises applying a coating containing a fluorescent material to said object, establishing a field of magnetic flux lines relative to said object so that lines of flux pass at an angle to said defects and discontinuities in the surface of said object, applying non-fluorescent magnetic particles over said surface and causing said particles to agglomerate on said coating adjacent to said defects and discontinuities, and with said particles so agglomerated on said coating inspecting said object under fluorescent light to locate said defects and discontinuities as defined by the magnetic particle indications produced by said agglomerated magnetic particles against said fluorescent background coating.

2. A method as defined in claim 1, said field of magnetic flux lines being established under conditions generating lines of magnetic flux which are substantially perpendicular to the defects and discontinuities in said object surface.

3. A method as defined in claim 1, employing an electromagnet to establish said field of magnetic flux lines and a substantially non-fluctuating direct current or an alternating current as the magnetizing current.

4. A method as defined in claim 1, employing a permanent magnet to establish said field of magnetic flux lines.

5. A method as defined in claim 1, said coating being a strippable coating, and including the step of removing said strippable coating containing said magnetic particle indications, to form a record of the location and size of said defects and discontinuities in the surface of said object.

6. A method as defined in claim 2, said coating being a strippable coating, and including the step of removing said strippable coating containing said magnetic particle indications, to form a record of the location and size of said defects and discontinuities in the surface of said object.

7. A method as defined in claim 1, said coating being a strippable coating, and including the step of applying over said strippable coating and over said magnetic particle indications, a second clear, strippable coating, and stripping the coating system including said coating containing said fluorescent material, said magnetic particle indications and said clear coating from the surface of said object, to provide a record of said defects and discontinuities in the surface of said object.

8. A method as defined in claim 2, said coating being a strippable coating, and including the steps of applying over said strippable coating and over said magnetic particle indications, a second clear, strippable coating, and stripping the coating system including said coating containing said fluorescent material, said magnetic particle indications and said clear coating from the surface of said object, to provide a record of said defects and discontinuities in the surface of said object.

9. A method as defined in claim 1, including establishing said field of magnetic flux lines and then applying over said coating a liquid medium containing said magnetic particles.

10. A method as defined in claim 1, said fluorescent material being a fluorescent dye and including in said coating a white pigment, and permitting inspection of said body under white light to reveal relatively large defects and discontinuities as defined by the magnetic particle indications against a white background coating.

11. A process as defined in claim 1, wherein said fluorescent material is a fluorescent dye, and wherein said coating comprises a vinyl resin containing titanium dioxide white pigment, and said magnetic particles are black magnetic particles.

12. A process as defined in claim 8, wherein said fluorescent material is a fluorescent dye, and wherein said coating comprises a vinyl resin containing titanium dioxide white pigment, and said magnetic particles are black magnetic particles, and said clear coating is a vinyl resin.

13. A method as defined in claim 12, including establishing said field of magnetic flux lines and then applying over said fluorescent coating a fluid medium containing said magnetic particles.

14. A method as defined in claim 9, wherein said medium in which said magnetic particles are suspended, is essentially a hydrocarbon liquid.

15. A method for nondestructive magnetic inspection of an object for detecting minute defects and discontinuities in the surface of said object, which comprises spraying a vinyl base paint containing a fluorescent dye on a magnetically permeable object, drying said coating, establishing a field of magnetic flux lines relative to said object so that lines of flux pass through the surface of said object substantially perpendicular to the defects and discontinuities therein, distributing over said coated surface a suspension of black magnetic particles in a kerosene medium, said field of magnetic flux lines causing said particles to agglomerate on said coating adjacent said defects and discontinuities in said part surface, and with said particles so agglomerated on said coating inspecting the coated surface of said object under fluorescent light to reveal said discontinuities as defined by the magnetic particle indications produced by said agglomerated particles against said fluorescent background coating.

16. A method as defined in claim 15, said vinyl base paint also containing a small amount of titanium dioxide to impart a white color to said coating, thereby enhancing the fluorescence of said coating when said coating is inspected under fluorescent light.

17. A method as defined in claim 16, including treating said coated surface containing said magnetic particle indications in a solvent selected from the group consisting of naphtha, trichloroethane and a fluorocarbon, said magnetic particle indications being maintained in their initially agglomerated positions, spraying a coating of a clear strippable vinyl over said vinyl coating containing said fluorescent dye and titanium dioxide, and over said magnetic particle indications, drying said last mentioned coating, sand stripping the entire coating system including said initial coating containing said titanium dioxide, said magnetic particle indications and said clear vinyl coating, from said object, and providing a record of said defects and discontinuities, as defined by said magnetic indications.

18. A method as defined in claim 17, including applying over said vinyl strippable resin coating a clear vinyl plastic tape to reinforce said clear vinyl coating, prior to stripping of the coating system.

19. A method as defined in claim 15, said vinyl base paint comprising vinyl chloride-vinyl acetate copolymer, a dioctyl phthalate plasticizer, and methyl ethyl ketone thinner, and said kerosene suspension of magnetic particles including a minor amount of a water soluble surfactant to permit removal of said suspension by water.

20. A method as defined in claim 18, said vinyl base paint comprising vinyl chloride-vinyl acetate copolymer, dioctyl phthalate plasticizer, and methyl ethyl ketone thinner, and said kerosene suspension of magnetic particles including a minor amount of a water soluble surfactant, said reinforcing tape being a clear vinyl reinforcing tape.

21. A method as defined in claim 16, and also permitting inspection of said body under white light to reveal relatively large defects and discontinuities as defined by the magnetic particle indications against a white background coating.

* * * * *